US010430748B2

(12) United States Patent
Bastide et al.

(10) Patent No.: US 10,430,748 B2
(45) **Date of Patent: *Oct. 1, 2019**

(54) UTILIZING SOCIAL PERFORMANCE PATTERNS TO MANAGE AND EVALUATE PERFORMANCE OF USER

(71) Applicant: International Business Machines Corporation, Armonk, NY (US)

(72) Inventors: Paul R. Bastide, Boxford, MA (US); Matthew E. Broomhall, Goffstown, NH (US); Sean Callanan, Dublin (IE); Sandra L. Kogan, Newton, MA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/173,979

(22) Filed: Oct. 29, 2018

(65) Prior Publication Data

US 2019/0066026 A1 Feb. 28, 2019

Related U.S. Application Data

(63) Continuation of application No. 15/159,365, filed on May 19, 2016, now Pat. No. 10,223,661, which is a continuation of application No. 14/925,289, filed on Oct. 28, 2015, now Pat. No. 10,169,733.

(51) Int. Cl.

| | |
|---|---|
| ***G06Q 50/00*** | (2012.01) |
| ***G06Q 10/06*** | (2012.01) |
| ***H04L 12/58*** | (2006.01) |

(52) U.S. Cl.

CPC ....... *G06Q 10/06398* (2013.01); *G06Q 50/01* (2013.01); *H04L 51/32* (2013.01)

(58) Field of Classification Search

None

See application file for complete search history.

(56) References Cited

U.S. PATENT DOCUMENTS 6,029,156 A * 2/2000 Lannert .................... G09B 7/04 706/11
6,032,141 A * 2/2000 O'Connor ................ G09B 7/04 434/107

(Continued)

FOREIGN PATENT DOCUMENTS

WO 2012078971 A2 6/2012
WO WO-2012078971 A2 * 6/2012 ............. G06Q 10/10

(Continued)

OTHER PUBLICATIONS

Boyd-Graber, Jordan, Kimberly Glasgow, and Jackie Sauter Zajac. "Spoiler alert: Machine learning approaches to detect social media posts with revelatory information." Proceedings of the 76th ASIS&T Annual Meeting: Beyond the Cloud: Rethinking Information Boundaries. AS for Info Science, 2013. (Year: 2013).*

(Continued)

*Primary Examiner* — Thomas L Mansfield
*Assistant Examiner* — Derick J Holzmacher
(74) *Attorney, Agent, or Firm* — Robert A. Voigt, Jr.; Winstead, P.C.

(57) ABSTRACT

A method, system and computer program product for improving management and performance of an employee. An indication of a goal sponsored by an owner, such as a manager, is received. After receiving an indication of a user subscribing to the goal sponsored by the owner, communications (e.g., posts) on the social network involving the subscribed user that include a tag designating the goal may be monitored. Upon detecting a completion of the goal by the subscribed user in the monitored communications, a pattern of steps (e.g., "prepare," "review" and "finish") to accomplish the goal is determined based on the monitored communications. The pattern may then be used to recommend actions to other users subscribed to the goal concerning accomplishing the goal based on the pattern. Furthermore, the owner may receive indications as to the progress of the user in accomplishing the goal based on the pattern.

10 Claims, 4 Drawing Sheets

300
RECEIVE AN INDICATION OF A GOAL SPONSORED BY AN OWNER — 301
RECEIVE AN INDICATION OF A USER SUBSCRIBING TO GOAL SPONSORED BY OWNER — 302
MONITOR COMMUNICATIONS ON A SOCIAL NETWORK INVOLVING SUBSCRIBED USER THAT INCLUDE A TAG DESIGNATING THE GOAL — 303
DETECT A COMPLETION OF GOAL BY SUBSCRIBED USER BASED ON MONITORED COMMUNICATIONS — 304
DETERMINE A PATTERN OF STEPS TO ACCOMPLISH GOAL BY USING NATURAL LANGUAGE PROCESSING ON MONITORED COMMUNICATIONS — 305
EVALUATE EFFECTIVENESS OF PATTERN TO ACCOMPLISH GOAL BY OTHER SUBSCRIBED USERS — 306
PRESENT EVALUATED EFFECTIVENESS OF PATTERN TO OWNER — 307

(56) References Cited

U.S. PATENT DOCUMENTS 7,089,222 B1 * 8/2006 Lannert .................... G06N 5/04 706/47
7,409,335 B1 * 8/2008 Horvitz ................. G06F 17/279 704/9
7,788,200 B2 8/2010 Crivat et al.
8,073,731 B1 * 12/2011 Rajasenan .......... G06Q 10/0637 705/7.42
9,110,958 B2 * 8/2015 Brust .................... G06F 3/0481
9,256,640 B2 * 2/2016 Branson .............. G06F 16/2453
9,781,067 B2 * 10/2017 Abou Mahmoud .... H04L 51/32
9,887,891 B2 * 2/2018 Abou Mahmoud .. H04L 43/045
10,013,890 B2 * 7/2018 Allen .................. G06F 17/2765
10,169,732 B2 * 1/2019 Grewal ............ G06Q 10/06398
2003/0172075 A1 9/2003 Reisman
2003/0216957 A1 11/2003 Florence et al.
2007/0198325 A1 * 8/2007 Lyerly .................... G06Q 10/06 705/7.13
2007/0198329 A1 * 8/2007 Lyerly .................... G06Q 10/00 705/7.16
2010/0125611 A1 * 5/2010 Boutboul .............. G06F 16/335 707/794
2010/0169134 A1 * 7/2010 Cheng .................... G06O 10/06 705/7.42
2010/0198757 A1 * 8/2010 Cheng .................... G06Q 10/10 706/12
2011/0213840 A1 9/2011 Boyer et al.
2011/0307487 A1 12/2011 Guralnik et al.
2011/0314098 A1 * 12/2011 Farrell ................... G06Q 10/10 709/204
2012/0004951 A1 * 1/2012 Garapati .......... G06Q 10/06398 705/7.42
2012/0089959 A1 * 4/2012 Park ...................... G06F 9/5055 717/105
2012/0150859 A1 * 6/2012 Hu ......................... G06Q 10/00 707/737
2012/0282841 A1 * 11/2012 Wei ...................... A63H 33/101 446/118
2013/0067351 A1 3/2013 Yokoi et al.
2013/0132866 A1 * 5/2013 Shafique ................ G06Q 50/01 715/758
2013/0145285 A1 * 6/2013 Klinger .................. G06Q 10/00 715/753
2013/0179438 A1 * 7/2013 Coldicott ............... G06Q 10/10 707/723
2013/0263019 A1 * 10/2013 Castellanos ............ G06Q 50/01 715/753
2013/0268534 A1 * 10/2013 Mathew ............. G06O 30/0201 707/740
2013/0282841 A1 * 10/2013 Bates ...................... H04L 51/32 709/206
2013/0317808 A1 * 11/2013 Kruel ...................... H04L 51/32 704/9
2014/0032667 A1 * 1/2014 Wright ................. H04L 65/403 709/204
2014/0033074 A1 * 1/2014 Thibaux ................. G06Q 50/01 715/753
2014/0156646 A1 * 6/2014 Brust .................... G06F 3/0481 707/722
2014/0157171 A1 * 6/2014 Brust .................... G06F 3/0481 715/771
2014/0181197 A1 * 6/2014 Baggott ................ H04L 65/403 709/204
2014/0188623 A1 * 7/2014 McNeil .................. G06Q 50/01 705/14.66
2014/0214404 A1 7/2014 Kalia et al.
2014/0215472 A1 * 7/2014 Motahari Nezhad ........................ G06Q 10/1097 718/102
2014/0229539 A1 8/2014 Powers
2014/0280371 A1 * 9/2014 Bastide ................... G06F 16/35 707/803
2014/0366052 A1 * 12/2014 Ives ................. H04N 21/23418 725/19
2015/0025977 A1 * 1/2015 Doyle .................... G06Q 50/01 705/14.66
2015/0064671 A1 * 3/2015 Murville .................. G09B 5/00 434/236
2015/0081725 A1 * 3/2015 Ogawa ................... G06Q 50/01 707/754
2015/0127748 A1 * 5/2015 Buryak ................... H04L 51/32 709/206
2016/0170956 A1 * 6/2016 Allen ...................... G06F 17/27 704/9
2016/0170968 A1 * 6/2016 Allen .................. G06F 17/2765 434/322
2016/0292794 A1 * 10/2016 Sedayao ................ G06Q 10/00
2016/0371626 A1 * 12/2016 Ali ................ G06Q 10/063114
2017/0061814 A1 * 3/2017 Coffey ................... G09B 19/00
2017/0076238 A1 * 3/2017 Bastide ............ G06Q 10/06398

FOREIGN PATENT DOCUMENTS

WO 2013102262 A1 7/2013
WO WO-2013102262 A1 * 7/2013 ............ G06Q 10/10
WO 2013177280 A1 11/2013
WO WO-2013177280 A1 * 11/2013 ............ H04L 51/32

OTHER PUBLICATIONS

Sattikar, A. A., and R. V. Kulkarni. “Natural language processing for content analysis in social networking.” International Journal of Engineering Inventions 1.4 (2012): 06-09. (Year: 2012).*

Bramsen, Philip, et al. “Extracting social power relationships from natural language.” Proceedings of the 49th Annual Meeting of the Association for Computational Linguistics: Human Language Technologies—vol. 1. Association for Computational Linguistics, 2011. (Year: 2011).*

IBM, “SPSS Text Analytics for Surveys,” http://www-03.ibm.com/software/products/en/spss-text-analytics-surveys, 2014, pp. 1-2.

IBM, “SPSS Statistics,” http://www-01.ibm.com/software/analytics/spss/products/statistics, 2014, pp. 1-2.

Wikipedia, “Natural Language Processing,” https://en.wikipedia.org/wiki/Natural_language_processing, 2014, pp. 1-10.

Twitter, “What are Replies and Mentions?” https://support.twitter.com/articles/14023#, 2014, pp. 1-3.

Wikipedia, “Mention (blogging),” https://en.wikipedia.org/wiki/Mention_(blogging), 2014, pp. 1-3.

Wikipedia, “Sentiment Analysis,” https://en.wikipedia.org/wiki/Sentiment_analysis, 2014, pp. 1-6.

Tulane, “Tips for Writing Goals and Objectives,” http://tulane.edu/publichealth/mchltp/upload/Tips-for-writing-goals-and-objectives.pdf, 2014, pp. 1-2.

Sattikar et al., “Natural Language Processing for Content Analysis in Social Networking,” International Journal of Engineering Inventions, vol. 1, Issue 4, Sep. 2012, pp. 6-9.

Boyd-Graber et al., “Spoiler Alert: Machine Learning Approaches to Detect Social Media Posts with Revelatory Information,” ASIST 2013, Montreal, Quebec, Canada, Nov. 1-6, 2013, pp. 1-9.

Bramsen et al., “Extracting Social Power Relationships from Natural Language,” Proceedings of the 49th Annual Meeting of the Association for Computational Linguistics, Portland, Oregon, Jun. 19-24, 2011, pp. 773-782.

List of IBM Patents or Patent Applications Treated as Related, Oct. 30, 2018, pp. 1-2.

Office Action for U.S. Appl. No. 16/173,880 dated Dec. 28, 2018, pp. 1-75.

Office Action for U.S. Appl. No. 16/173,880 dated Mar. 19, 2019, pp. 1-74.

* cited by examiner

UTILIZING SOCIAL PERFORMANCE PATTERNS TO MANAGE AND EVALUATE PERFORMANCE OF USER

TECHNICAL FIELD

The present invention relates generally to workplace evaluations, and more particularly to improving management and performance of a user utilizing social performance patterns.

BACKGROUND

In the workplace, an evaluation is a tool employers use to review the performance of an employee. Usually, the employee's supervisor (and frequently, a more senior manager) is responsible for evaluating the employee. A private conference is often scheduled to discuss the evaluation.

The evaluation, which typically occurs once during the year (e.g., end of the year), includes an assessment as to how well the employee is doing. Sometimes, this may include a scale rating indicating strengths and weaknesses in key areas (e.g., following instructions, promptness, and ability to get along with others). Often, the supervisor and manager will discuss the key areas.

The evaluation may also include employee goals that are expected to be met (or have significant progress made) by a set time, such as the next evaluation. Sometimes, the employee may voluntarily offer a goal, while other times it will be set by the employee's boss.

Furthermore, the evaluation may include the sharing of feedback by the worker's fellow employees and supervisors. The employee is given his/her chance to share his/her feelings, concerns and suggestions about the workplace as well.

Typically, supervisors/managers spend many hours in assessing the employee, such as time spent gathering feedback about the employee that was made during the year by reviewing e-mails, notes and calendar entries pertaining to the employee. As a result of gathering feedback once during the year, such as at the end of the year, some of the relevant feedback may not be identified and hence not used in assessing the employee.

Furthermore, such evaluation processes fail to consider feedback about the employee that was made using social media (e.g., activity stream, profile, wall, microblog). For example, colleagues of the employee may provide comments about the employee's work on social media. Neither does such evaluation processes attempt to provide managers and employees guidance and recommended actions in meeting goals throughout the year.

As a result, current evaluation processes lack a means for effectively allowing the manager to consider all relevant information, including employee feedback from social media sources, in assessing the employee as well as actively evaluating the employee performance and recommending actions in accomplishing goals for the employee throughout the year.

SUMMARY

In one embodiment of the present invention, a method for improving management and performance of an employee comprises receiving an indication of a goal sponsored by an owner, where the goal is a desired result that a person, a group or an organization desires to achieve. The method further comprises receiving an indication of a first user subscribing to the goal sponsored by the owner. The method additionally comprises monitoring communications on a social network involving the first user subscribed to the goal that includes a tag designating the goal. Furthermore, the method comprises detecting a completion of the goal based on the monitored communications using natural language processing. Additionally, the method comprises determining a pattern of steps in accomplishing the goal by using natural language processing on the monitored communications involving the first user subscribed to the goal. In addition, the method comprises recommending actions to a second user concerning accomplishing the goal based on the pattern of steps, where the second user subscribed to the goal sponsored by the owner.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for improving management and performance of an employee. In one embodiment of the present invention, an indication of a goal sponsored by an owner, such as a manager, is received. A "goal," as used herein, is a desired result that a person or organization desires to achieve. The goal may be for a user, a group or an organization. For example, a user (referred to herein as an "owner") may create and sponsor a goal (e.g., "achieve master certified widget tuner"), where such a goal may be stored in a look-up table and associated with a tag (e.g., symbol $). After receiving an indication of a user subscribing to the goal sponsored by the owner, communications (e.g., posts) on the social network involving the subscribed user that include the tag designating the goal may be monitored. Upon detecting a completion of the goal by the subscribed user in the monitored communications, such as by identifying certain keywords (e.g., "finish") in the monitored communications via natural language processing, a pattern ("social performance pattern") of steps (e.g., "prepare," "review" and "finish") to accomplish the goal is determined using natural language processing on the monitored communications. The pattern may then be used to recommend actions to other users subscribed to the goal concerning accomplishing the goal based on the pattern. Furthermore, the owner may receive indications as to the progress of the user in accomplishing the goal based on the pattern. In this manner, these social performance patterns may be utilized by both the manager and employee to improve the management and performance of the user.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
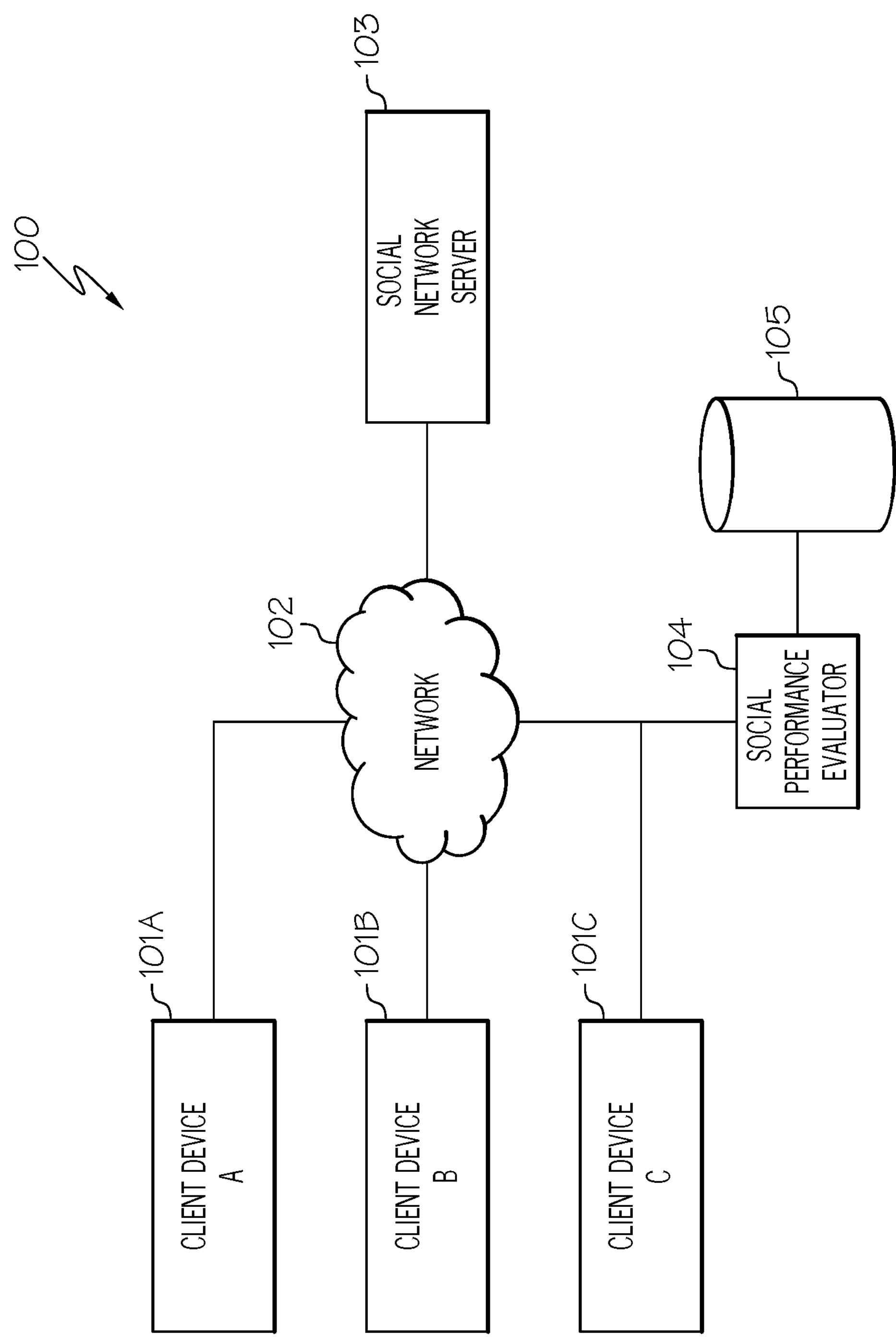
FIG. 1 illustrates a social network system configured in accordance with an embodiment of the present invention.

Referring now to the Figures in detail, FIG. 1 illustrates a social network system 100 configured in accordance with an embodiment of the present invention. Referring to FIG. 1, social network system 100 includes a community of users using client devices 101A-101C (identified as "Client Device A," "Client Device B," and "Client Device C," respectively, in FIG. 1) to be involved in social network system 100. Client devices 101A-101C may collectively or individually be referred to as client devices 101 or client device 101, respectively. Client device 101 may be a portable computing unit, a Personal Digital Assistant (PDA), a smartphone, a laptop computer, a mobile phone, a navigation device, a game console, a desktop computer system, a workstation, an Internet appliance and the like.

Client devices 101 may participate in a social network by communicating (by wire or wirelessly) over a network 102, which may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 further includes a social network server 103, which may be a web server configured to offer a social networking and/or microblogging service, enabling users of client devices 101 to send and read other users' posts. "Posts," as used herein, include any one or more of the following: text (e.g., messages, comments, sub-comments and replies), audio, video images, etc. Social network server 103 is connected to network 102 by wire or wirelessly. While FIG. 1 illustrates a single social network server 103, it is noted for clarity that multiple servers may be used to implement the social networking and/or microblogging service.

System 100 further includes what is referred to herein as the "social performance evaluator" 104 connected to network 102 by wire or wirelessly. Social performance evaluator 104 is configured to allow managers to actively evaluate the employee performance throughout the year as well as to recommend actions to the employee to accomplish the employee's goals throughout the year utilizing social media sources as discussed further below. In one embodiment, social performance evaluator 104 monitors communications (e.g., posts) on a social network concerning "goals" subscribed by users (e.g., users of client devices 101). These goals are created by a user (e.g., user of client device 101) referred to herein as an "owner." Such goals may be stored in a look-up table, such as in database 105 connected to social performance evaluator 104, where the goals are referenced by a tag used in a communication (e.g., social media post), such as the symbol "$" in the post. Communications on a social network involving such goals by a user subscribed to the goal are monitored by social performance evaluator 104 to determine a pattern of steps (also referred to herein as "social performance patterns") in accomplishing the goal as well as to determine any delay in accomplishing the goal or a near completion of the goal as well as to detect a different set of steps (different pattern) in accomplishing the goal as discussed further below. Such analysis may be performed, at least in part, utilizing natural language processing on the monitored communications. These social performance patterns may be utilized by both the manager and employee to improve the management and performance of the user as discussed further below. A description of the hardware configuration of social performance evaluator 104 is provided below in connection with FIG. 2.

As discussed above, database 105 may store goals and the tags associated with those goals. Database 105 may also store patterns associated with achieving such goals as well as store information pertaining to the users (e.g., users of client devices 101) that subscribe to such goals, such as the stage in accomplishing the goal using the pattern(s) associated with that goal. While the following discusses the goals as having a single pattern associated with it, it is noted that each goal may be associated with multiple patterns. Furthermore, database 105 may store any rewards (e.g., points) attributed to the subscribed users for accomplishing subscribed goals.

System 100 is not to be limited in scope to any one particular network architecture. System 100 may include any number of client devices 101, networks 102, social network servers 103, social performance evaluators 104 and databases 105. Furthermore, in one embodiment, social performance evaluator 104 may be part of client device 101 or social network server 103.

Figure 2:
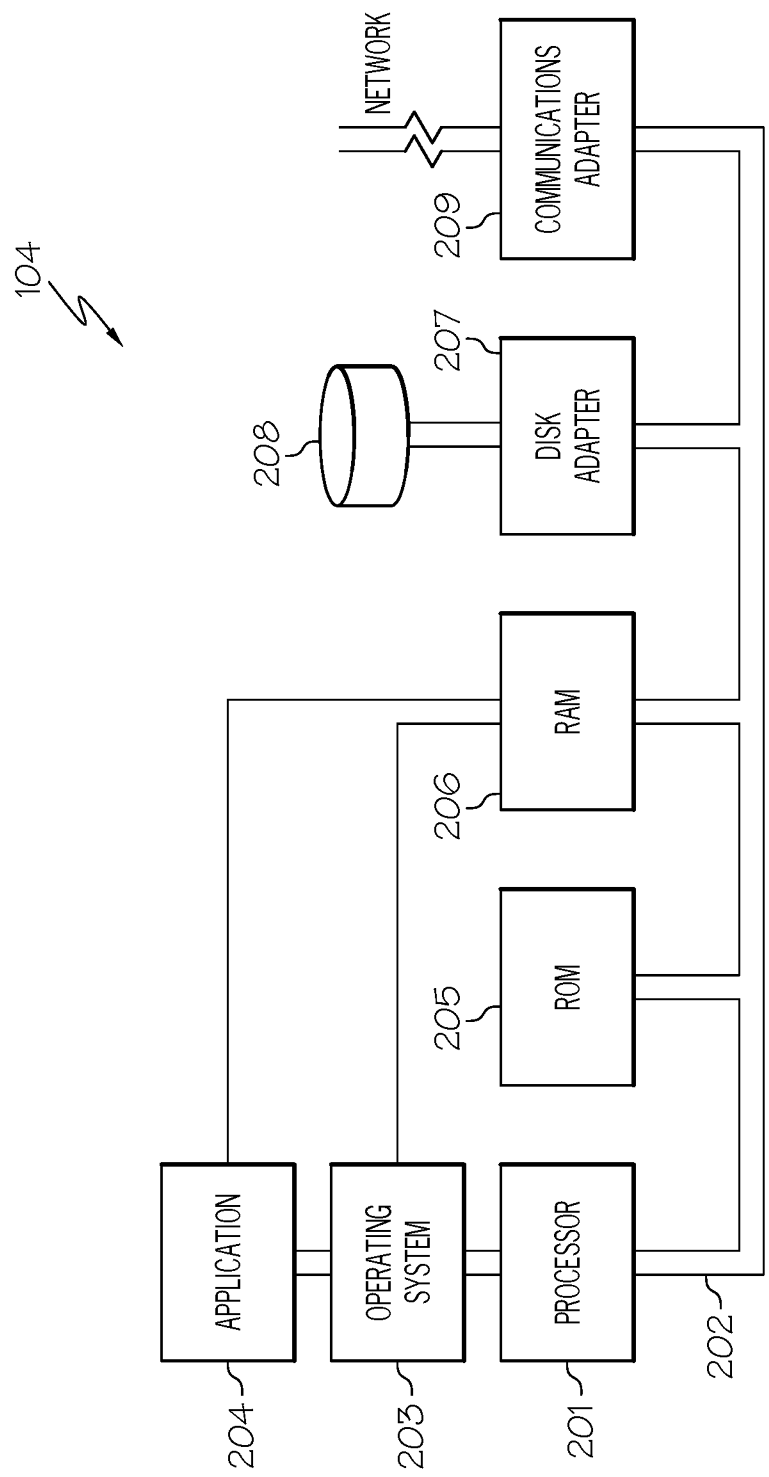
FIG. 2 illustrates a hardware configuration of a social performance evaluator configured in accordance with an embodiment of the present invention.

Referring now to FIG. 2, FIG. 2 illustrates a hardware configuration of social performance evaluator 104 (FIG. 1), which is representative of a hardware environment for practicing the present invention. Referring to FIG. 2, social performance evaluator 104 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for improving the management and performance of the user utilizing social performance patterns as discussed further below in association with FIGS. 3-4.

Referring again to FIG. 2, read-only memory ("ROM") 205 is coupled to system bus 202 and includes a basic input/output system ("BIOS") that controls certain basic functions of social performance evaluator 104. Random access memory ("RAM") 206 and disk adapter 207 are also coupled to system bus 202. It should be noted that software components including operating system 203 and application 204 may be loaded into RAM 206, which may be social performance evaluator's 104 main memory for execution.

Disk adapter 207 may be an integrated drive electronics ("IDE") adapter that communicates with a disk unit 208, e.g., disk drive. It is noted that the program for improving the management and performance of the user utilizing social performance patterns, as discussed further below in association with FIGS. 3-4, may reside in disk unit 208 or in application 204.

Social performance evaluator 104 may further include a communications adapter 209 coupled to bus 202. Communications adapter 209 interconnects bus 202 with an outside network (e.g., network 102 of FIG. 1) thereby allowing social performance evaluator 104 to communicate with client devices 101 and social network server 103.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, in the workplace, an evaluation is a tool employers use to review the performance of an employee. Usually, the employee's supervisor (and frequently, a more senior manager) is responsible for evaluating the employee. A private conference is often scheduled to discuss the evaluation. The evaluation, which typically occurs once during the year (e.g., end of the year), includes an assessment as to how well the employee is doing. Sometimes, this may include a scale rating indicating strengths and weaknesses in key areas (e.g., following instructions, promptness, and ability to get along with others). Often, the supervisor and manager will discuss the key areas. The evaluation may also include employee goals that are expected to be met (or have significant progress made) by a set time, such as the next evaluation. Sometimes, the employee may voluntarily offer a goal, while other times it will be set by the employee's boss. Furthermore, the evaluation may include the sharing of feedback by the worker's fellow employees and supervisors. The employee is given his/her chance to share his/her feelings, concerns and suggestions about the workplace as well. Typically, supervisors/managers spend many hours in assessing the employee, such as time spent gathering feedback about the employee that was made during the year by reviewing e-mails, notes and calendar entries pertaining to the employee. As a result of gathering feedback once during the year, such as at the end of the year, some of the relevant feedback may not be identified and hence not used in assessing the employee. Furthermore, such evaluation processes fail to consider feedback about the employee that was made using social media (e.g., activity stream, profile, wall, microblog). For example, colleagues of the employee may provide comments about the employee's work on social media. Neither does such evaluation processes attempt to provide managers and employees guidance and recommended actions in meeting goals throughout the year. As a result, current evaluation processes lack a means for effectively allowing the manager to consider all relevant information, including employee feedback from social media sources, in assessing the employee as well as actively evaluating the employee performance and recommending actions in accomplishing goals for the employee throughout the year.

Figure 3:
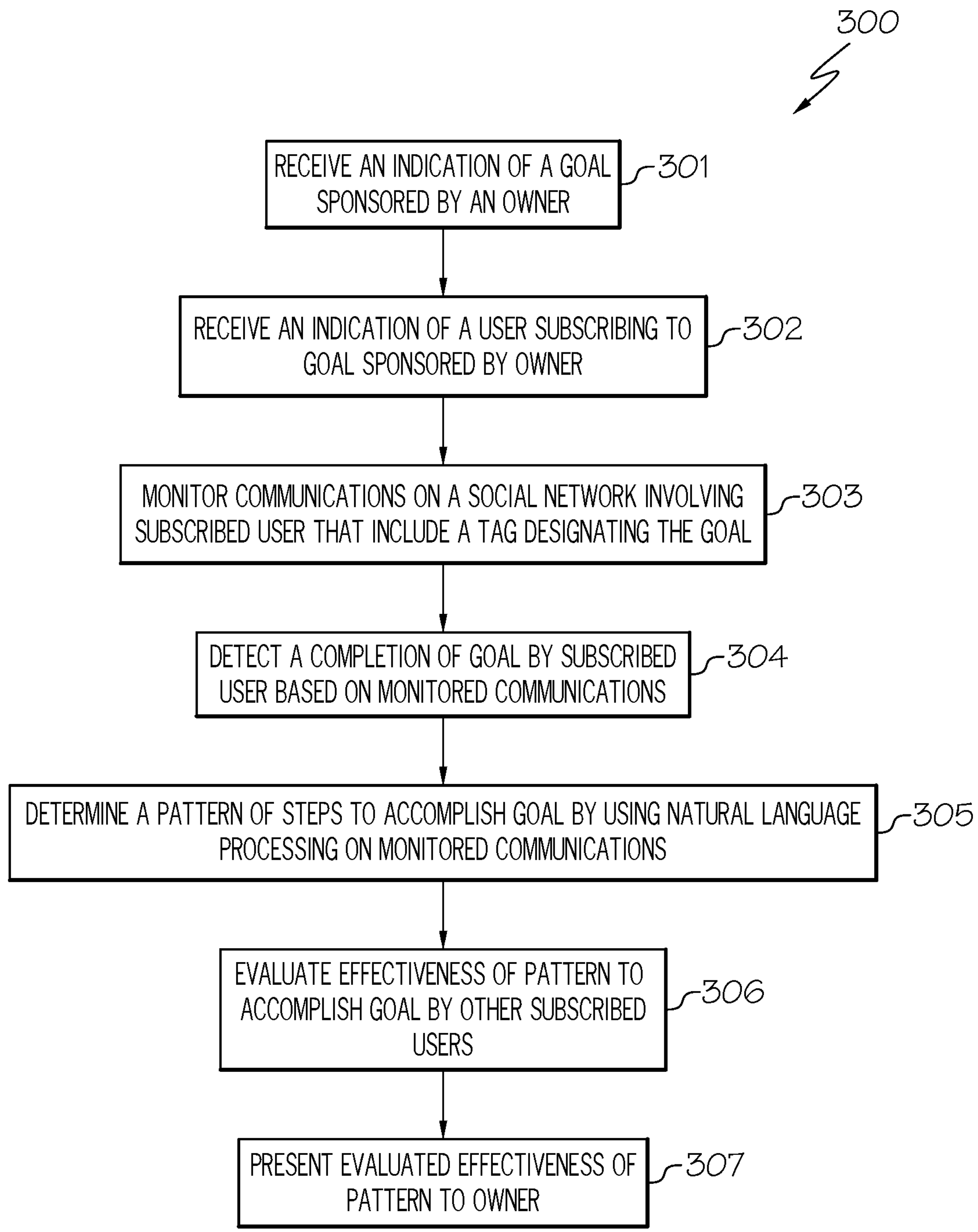
FIG. 3 is a flowchart of a method for establishing a social performance pattern to accomplish a goal in accordance with an embodiment of the present invention.
Figure 4:
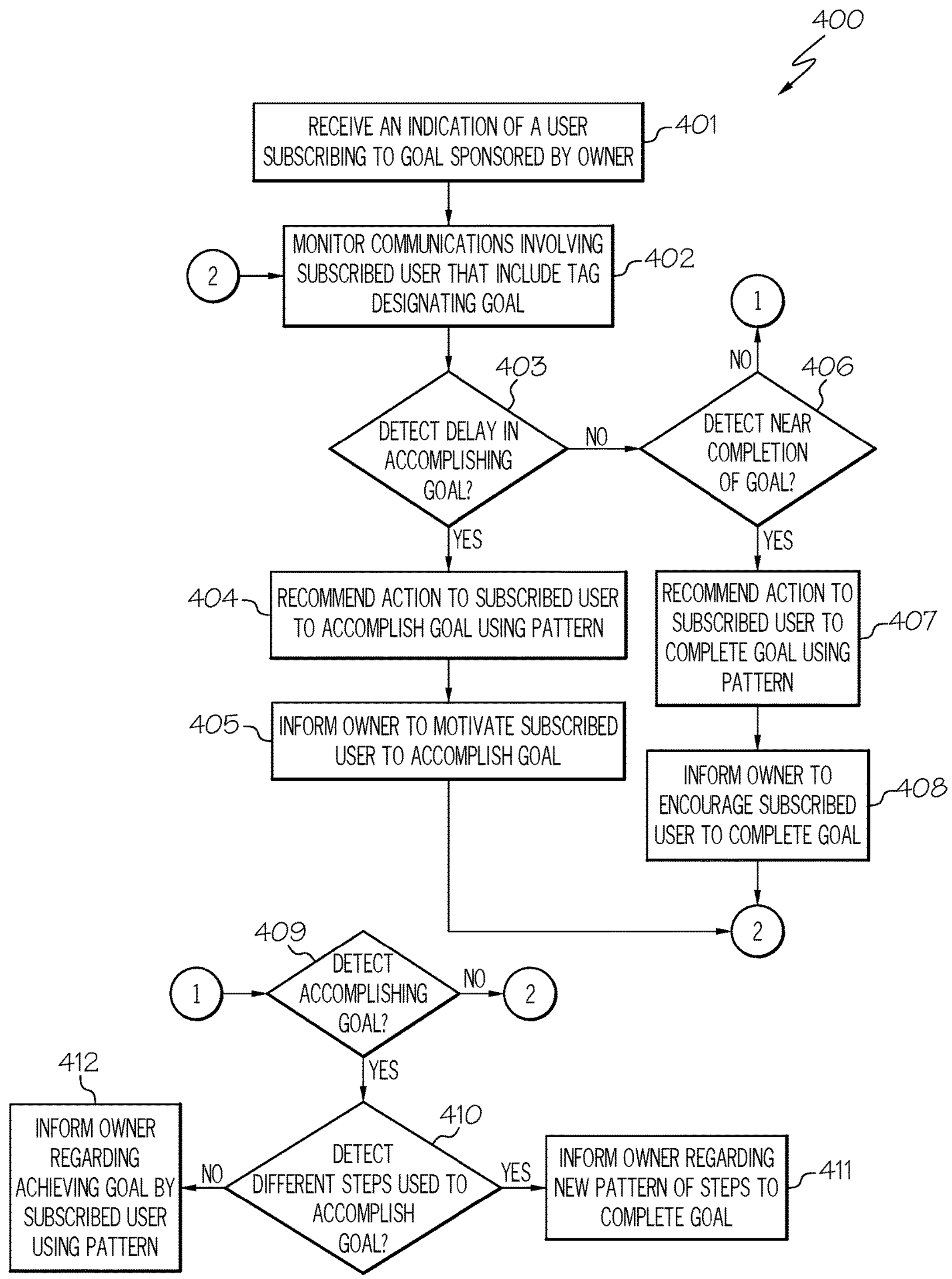
FIG. 4 is a flowchart of a method for evaluating the employee performance and recommending actions to accomplish the employee's goal using the social performance pattern in accordance with an embodiment of the present invention.

The principles of the present invention provide a means for actively evaluating the employee performance and recommending actions in accomplishing goals for the employee throughout the year utilizing social performance patterns as discussed below in association with FIGS. 3 and 4. FIG. 3 is a flowchart of a method for establishing a social performance pattern to accomplish a goal. FIG. 4 is a flowchart of a method for evaluating the employee performance and recommending actions to accomplish the employee's goal using the social performance pattern.

As stated above, FIG. 3 is a flowchart of a method 300 for establishing a social performance pattern to accomplish a goal in accordance with an embodiment of the present invention.

Referring to FIG. 3, in conjunction with FIGS. 1-2, in step 301, social performance evaluator 104 receives an indication of a goal sponsored by an owner, such as a manager (e.g., user of client device 101A). A "goal," as used herein, is a desired result that a person or organization desires to achieve. The goal may be for a user, a group or an organization. For example, a user (e.g., user of client device 101A) may create and sponsor a goal (e.g., "achieve master certified widget tuner"). Such a goal may be stored in a look-up table, such as in database 105, where the goals are associated with a tag (e.g., symbol $). Such goals can be looked-up in the table using the tag. Furthermore, communications involving the goal, such as posts on a social network, can be monitored by identifying communications using the tag.

In step 302, social performance evaluator 104 receives an indication of a user (e.g., user of client device 101B) subscribing to the goal sponsored by the owner.

In step 303, social performance evaluator 104 monitors the communications (e.g., posts) on a social network involving the subscribed user (e.g., user of client device 101B) that include the tag designating the goal. For example, suppose that Alice (e.g., user of client device 101A) creates and sponsors a goal ("achieve master certified widget tuner") with a designated tag (e.g., symbol "$"). Suppose that Bob (e.g., user of client device 101B) subscribes to the goal which may be referenced in communications, such as "$certified-wt." Social performance evaluator 104 may then monitor communications on the social network involving Bob that include the tag designating the goal. For instance, the following communications may be identified by social performance evaluator 104 based on monitoring the communications on the social network involving Bob that include the tag designating the goal:

Bob posts "preparing for $certified-wt"

Charlie posts "preparing with @Bob for $certified-wt"

Bob posts "@Doug reviewing $certified-wt"

Doug posts "Congrats @Bob on finishing $certified-wt"

These posts each include a reference to the subscribed user (e.g., Bob) as well as to the subscribed goal (e.g., "$certified-wt").

In step 304, social performance evaluator 104 detects a completion of the goal by the subscribed user based on the monitored communications. For example, social performance evaluator 104 may utilize natural language processing in detecting the completion of the goal. For instance, natural language processing may be used to detect the completion of the goal by identifying certain keywords, such as "finish," "finishing," and "completion," used in the monitored communications concerning the goal and the subscribed user. For example, social performance evaluator 104 may detect a completion of the goal by the subscribed user of Bob based on the post of "Congrats @Bob on finishing $certified-wt" since the term "finishing" was used in connection with the goal and the subscribed user.

In step 305, social performance evaluator 104 determines a pattern of steps ("social performance pattern") to accomplish the goal by using natural language processing on the monitored communications. For example, referring to the posts discussed in step 303, social performance evaluator 104 may determine that the sequence in achieving the goal includes at least "prepare," "review," and "finish" based on the terms "preparing," "reviewing" and "finishing" being used in the posts. Social performance evaluator 104 may also include steps in the social performance pattern to accomplish the goal that were not directly derived from language used in the monitored communications. For instance, Bob and his manager may assess that the goal was completed successfully and that Bob should receive a positive score (e.g., +2 points), which may be recorded by social performance 104, such as in database 105. In another example, Bob's manager may post "Congrats @Bob for successfully completing $certified-wt" where social performance evaluator 104 detects the successful completion of the goal based on identifying the term "successfully" using natural language processing. As a result, social performance evaluator 104 may determine that the social performance pattern in accomplishing the goal is "prepare," "review," "finish" and "success."

In step 306, social performance evaluator 104 evaluates the effectiveness of the pattern to accomplish the goal by other subscribed users (e.g., user of client device 101C). The effectiveness of the social performance pattern may be based on the success or failure in achieving the goal using the pattern, the length of time in achieving the goal, social media comments (e.g., likes) pertaining to the pattern, the profit or revenue generated from achieving the goal, etc. In one embodiment, the effectiveness of the pattern may be evaluated, at least in part, utilizing natural language processing. For example, social performance evaluator 104 may determine the success or failure in achieving the goal using the associated pattern based on the keywords "success" or "failure" used in connection with completing the goal. In another example, social performance evaluator 104 may determine the profit or revenue generated from achieving the goal based on keywords directed to profit, revenue, etc. used in the monitored communications in connection with the successful completion of the goal. In one embodiment, social performance evaluator 104 may utilize a timer, such as implemented in software, to determine a length of time in achieving the goal from the time that the goal was sponsored by the owner to the time that the goal was achieved by the subscribed user. In one embodiment, social performance evaluator 104 may count the number of likes pertaining to the pattern over a designated period of time which may be used to assess the effectiveness of the pattern to accomplish the goal.

In step 307, social performance evaluator 104 presents the evaluated effectiveness of the pattern to the owner. In one embodiment, such an evaluation may be used by the owner (e.g., manager) to determine whether the steps of the pattern should be modified to better assist the user (e.g., employee) to accomplish the goal or whether the pattern should be replaced with a better pattern.

The pattern established using method 300 may be used to evaluate the employee performance and recommend actions to accomplish the employee's goal as discussed below in connection with FIG. 4.

FIG. 4 is a flowchart of a method 400 for evaluating the employee performance and recommending actions to accomplish the employee's goal using the social performance pattern in accordance with an embodiment of the present invention.

Referring to FIG. 4, in conjunction with FIGS. 1-3, in step 401, social performance evaluator 104 receives an indication of a user (e.g., user of client device 101C) subscribing to the goal sponsored by the owner, such as discussed in step 302 of method 300.

In step 402, social performance evaluator 104 monitors the communications (e.g., posts) on a social network involving the subscribed user (e.g., user of client device 101C) that include the tag designating the goal, such as discussed in step 303 of method 300.

In step 403, a determination is made by social performance evaluator 104 as to whether a delay is detected in accomplishing the goal by the subscribed user using the pattern associated with the goal. For example, the following communications may be identified by social performance evaluator 104 based on monitoring the communications on the social network involving Eve (e.g., user of client device 101C) that include the tag designating the goal:

Eve posts "preparing for $certified-wt with @Bob"

Using the pattern discussed above, the next step in accomplishing the goal should be the review step. However, if there are no further communications (such as after a designated period of time) detected by social performance evaluator 104 concerning Eve accomplishing the goal, such as a review step, then social performance evaluator 104 may detect that there has been a delay in accomplishing the goal by the subscribed user.

If social performance evaluator 104 detected a delay in accomplishing the goal by the subscribed user using the pattern associated with the goal, then, in step 404, social performance evaluator 104 recommends actions to the subscribed user to accomplish the goal using the pattern, such as suggesting to the subscribed user to move forward with a review. For instance, referring to the above example, social performance evaluator 104 may post a message on the social network to Eve to move forward with a review concerning the goal (e.g., "missing pending review for $certified-wt"). Next steps in accomplishing the goal may be extracted from the pattern associated with the goal. It is noted that multiple social performance patterns may be associated with the goal and that the next step recommended/suggested for the subscribed user may be based on the pattern with the highest rating (i.e., with the best evaluation as discussed in step 306 of method 300). In one embodiment, the recommended actions may be personalized, such as to the user's job role or current business needs. In one embodiment, only successful patterns may be utilized for recommending actions to the subscribed user. Those patterns that were deemed to be unsuccessful are identified and alerted to the owners as discussed in step 307 of method 300.

In step 405, social performance evaluator 104 informs the owner (e.g., manager) to motivate the subscribed user to accomplish the goal, such as by posting a message on the social network encouraging the subscribed user to continue to achieve the goal. After informing the owner to motivate the subscribed user to accomplish the goal, social performance evaluator 104 continues to monitor communications (e.g., posts) on the social network involving the subscribed user (e.g., user of client device 101C) that include the tag designating the goal in step 402.

If, however, social performance evaluator 104 did not detect a delay in accomplishing the goal by the subscribed user, then, in step 406, a determination is made by social performance evaluator 104 as to whether a near completion of the goal by the subscribed user is detected, such as completing all but the last steps according to the pattern associated with the goal.

If social performance evaluator 104 detected a near completion of the goal by the subscribed user, then, in step 407, social performance evaluator 104 recommends actions to the subscribed user to complete the goal using the pattern, such as suggesting to the subscribed user to complete the goal. For instance, referring to the above example, social performance evaluator 104 may post a message on the social network to Eve to complete the goal (e.g., "almost finished $certified-wt"). In one embodiment, social performance evaluator 104 may also suggest a mentor or provide assistance to the subscribe user to complete the goal, such as suggesting other users who have accomplished the same goal (information of other users completing the same goal obtained from database 105).

In step 408, social performance evaluator 104 informs the owner to encourage the subscribed user to complete the goal, such as via a message posted on the social network. Once the owner is informed that the subscribed user has almost completed the goal, the owner may encourage the subscribed user to complete the goal. For example, the owner may post a message on the social network to the subscribed user to encourage the subscribed user to complete the goal (e.g., "you have almost finished $certified-wt, you can do it!").

After informing the owner that the subscribed user has almost completed the goal, social performance evaluator 104 continues to monitor communications (e.g., posts) on the social network involving the subscribed user (e.g., user of client device 101C) that include the tag designating the goal in step 402.

If, however, social performance evaluator 104 did not detect a near completion of the goal by the subscribed user, then, in step 409, a determination is made by social performance evaluator 104 as to whether a completion of the goal by the subscribed user is detected. As discussed above, social performance evaluator 104 may utilize natural language processing in determining whether the subscribed user completed the goal, such as by identifying keywords (e.g., "finish") in the messages monitored by social performance evaluator 104 concerning the subscribed user attempting to achieve the goal.

If social performance evaluator 104 did not detect the completion of the goal by the subscribed user, then social performance evaluator 104 continues to monitor the communications (e.g., posts) on the social network involving the subscribed user (e.g., user of client device 101C) that include the tag designating the goal in step 402.

If, however, the completion of the goal by the subscribed user is detected, then, in step 410, a determination is made by social performance evaluator 104 as to whether different steps were detected that were used to accomplish the goal by the subscribed user in comparison to the steps of the pattern in question.

If different steps were used to accomplish the goal by the subscribed user in comparison to the steps of the pattern in question, then, in step 411, social performance evaluator 104 informs the owner regarding a new pattern of steps to complete the goal. For example, suppose that social performance evaluator 104 detects the following post pattern:

"preparing with @Bob for $certified-wt"

"drafting application for $certified-wt"

"review of $certified-wt with @Dave"

"finished with $certified-wt"

Hence, in this example, the step of "drafting" is a new additional step in comparison to the pattern steps of "prepare," "review" and "finish." As a result, the owner (e.g., manager) may be informed of this new pattern which may be evaluated for effectiveness as discussed above in connection with step 306 of method 300. After receiving an indication that the subscribed user achieved the goal with a new pattern, the owner may reward the user, such as via points.

If, however, different steps were not used to accomplish the goal by the subscribed user in comparison to the steps of the pattern in question, then, in step 412, social performance evaluator 104 informs the owner regarding the subscribed user achieving the goal using the pattern thereby further providing evidence as to the effectiveness of the pattern. After receiving an indication that the subscribed user achieved the goal, the owner may reward the user, such as via points.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for improving management and performance of an employee, the method comprising:

receiving, by a social performance evaluator, an indication of a goal sponsored by an owner, wherein said goal is a desired result that a person, a group or an organization desires to achieve, wherein said owner is a user of a first client device connected to said social performance evaluator via a network;

receiving, by said social performance evaluator, an indication of a first user of a second client device connected to said network subscribing to said goal sponsored by said owner;

monitoring, by said social performance evaluator, communications on a social network involving said first user subscribed to said goal that includes a tag designating said goal;

detecting, by said social performance evaluator, a completion of said goal based on said monitored communications using natural language processing;

determining, by said social performance evaluator, a pattern of steps in accomplishing said goal by using natural language processing on said monitored communications involving said first user subscribed to said goal;

evaluating, by said social performance evaluator, an effectiveness of said pattern to accomplish said goal by other subscribed users, wherein said effectiveness of said pattern is based on a success or a failure in achieving said goal using said pattern, a length of time in achieving said goal, social media comments pertaining to said pattern, and a profit or revenue generated from achieving said goal, wherein said social performance evaluator utilizes a timer to determine said length of time in achieving said goal from a time said goal was sponsored by said owner to a time said goal was achieved by a subscribed user; and recommending, by said social performance evaluator, actions to a second user of a third client device connected to said network concerning accomplishing said goal based on said pattern of steps, wherein said second user subscribed to said goal sponsored by said owner.

2. The method as recited in claim 1, wherein said effectiveness of said pattern is evaluated utilizing natural language processing.

3. The method as recited in claim 1 further comprising:

presenting said evaluated effectiveness of said pattern to said owner to determine whether steps of said pattern should be modified to better assist users to accomplish said goal or whether said pattern should be replaced with a better pattern.

4. The method as recited in claim 1 further comprising:

monitoring communications on said social network involving said second user that includes said tag designating said goal; and detecting a delay in completing said goal by said second user.

5. The method as recited in claim 4 further comprising: informing said owner to motivate said second user to accomplish said goal in response to detecting said delay in completing said goal by said second user.

6. The method as recited in claim 1 further comprising: monitoring communications on said social network involving said second user that include said tag designating said goal; and detecting a near completion of said goal by said second user.

7. The method as recited in claim 6 further comprising: recommending said owner to encourage said second user to complete said goal in response to detecting said near completion of said goal by said second user.

8. The method as recited in claim 1 further comprising: monitoring communications on said social network involving a third user subscribed to said goal sponsored by said owner that includes said tag designating said goal;

detecting a completion of said goal by said third user; and detecting a new pattern of steps to complete said goal based on said monitored communications involving said third user.

9. The method as recited in claim 8 further comprising: informing said owner regarding said new pattern of steps to complete said goal.

10. The method as recited in claim 1, wherein said goal is stored in a look-up table where said goal is associated with said tag.

* * * * *